United States Patent [19]

Igaki et al.

[11] Patent Number: 5,561,828
[45] Date of Patent: Oct. 1, 1996

[54] METHOD OF MANUFACTURING A CERAMIC ELECTRONIC PART

[75] Inventors: Emiko Igaki, Amagasaki; Masakazu Tanahashi, Osaka; Takashi Iguchi, Chitose; Yoichi Okinaka, Sapporo, all of Japan

[73] Assignee: Matsushita Electric Industrial Co., Ltd., Osaka, Japan

[21] Appl. No.: 297,218

[22] Filed: Aug. 29, 1994

[30] Foreign Application Priority Data

Sep. 14, 1993 [JP] Japan ................................. 5-228548

[51] Int. Cl.⁶ ........................... B22F 3/10; B22F 5/00
[52] U.S. Cl. ............................................... 419/10; 419/19
[58] Field of Search ............................................. 419/10, 19

[56] References Cited

U.S. PATENT DOCUMENTS

| | | | |
|---|---|---|---|
| 4,228,482 | 10/1980 | Bouchard et al. | 361/321 |
| 4,426,356 | 1/1984 | Nair | 419/21 |
| 4,517,155 | 5/1985 | Prakash et al. | 419/19 |
| 5,000,909 | 3/1991 | Charles et al. | 419/8 |
| 5,184,277 | 2/1993 | Shizuno et al. | 361/321 |
| 5,319,517 | 6/1994 | Nomura et al. | 361/321.4 |
| 5,370,759 | 12/1994 | Hakotani et al. | 156/73.1 |

FOREIGN PATENT DOCUMENTS

| | | |
|---|---|---|
| 62-106612 | 5/1987 | Japan . |
| 2-122511 | 5/1990 | Japan . |
| 5-275271 | 10/1993 | Japan . |

*Primary Examiner*—Charles T. Jordan
*Assistant Examiner*—Daniel Jenkins
*Attorney, Agent, or Firm*—Fish & Richardson, P.C.

[57] ABSTRACT

A method of manufacturing a ceramic electronic part includes the steps of: firing Pd electrodes or alloy electrodes containing Pd as a primary metal along with ceramics in the atmosphere in which Pd cannot be oxidized within the range (I) of oxidizing temperature of Pd in air; and firing the Pd electrodes or alloy electrodes along with the ceramics in air within the range (II) of deoxidizing temperature of PdO in air. The method can manufacture a ceramic electronic part, such as a multilayer ceramic capacitor, including Pd electrodes or alloy electrodes which contain Pd as a primary metal without forming internal defects inside the ceramic electronic part and reducing its properties.

15 Claims, 4 Drawing Sheets

METHOD OF MANUFACTURING A CERAMIC ELECTRONIC PART

FIELD OF THE INVENTION

The invention relates to a method of manufacturing a ceramic electronic part such as a multilayer ceramic capacitor. More specifically, the invention relates to a method of manufacturing an integrated sintered composite which contains electrodes and ceramics.

BACKGROUND OF THE INVENTION

Conventional integrated sintered ceramic electronic parts that contain Pd electrodes or alloy electrodes containing Pd as a primary metal, are manufactured by firing the electrodes and ceramics simultaneously in air. By firing these electrodes in air, Pd is oxidized up to a temperature below 820° C. At 820° C. and above, however, oxidized Pd is again deoxidized so that the Pd electrodes or the alloy electrodes are sintered as metals and integrated with ceramics.

For example, the Pd electrodes of a multilayer ceramic capacitor are formed by the following steps of:

forming a green chip by laminating ceramic sheets and electrode films alternately;

burning out all the organic constituents of the green chip; and firing the chip in air.

In the step of burning out the organic constituents of the green chip, Pd contained in the electrodes of the chip is temporarily deoxidized. In the step of firing the chip in air, however, Pd is oxidized and its volume increases. As a result, the volume of the electrodes also increases and defects are formed inside the ceramic body after this step.

In order to solve this problem, methods of preventing the increase in volume of the electrodes due to the oxidization of Pd have been invented. For example, Published Unexamined Japanese Patent Application No. Hei 5-275271 discloses use of particles, which are a mixture of silver and palladium, as electrode paste so that the oxidizing velocity is slowed down and the increase in the volume of the electrodes due to the oxidization of Pd is prevented. However, especially when the initial density of electrode films is high, the increase in the volume of the electrodes cannot be satisfactorily prevented by this method.

SUMMARY OF THE INVENTION

An object of this invention is to provide a method of manufacturing a ceramic electronic part, such as a multilayer ceramic capacitor, which contains Pd electrodes or alloy electrodes containing Pd as a primary metal. A further object of this invention is to provide a method of manufacturing an integrated sintered ceramic electronic part having no internal defects. A still further object of this invention is to provide a method of manufacturing a ceramic electronic part which can maintain its properties even if it is fired in a large quantity during the manufacturing processes.

In order to provide these and other objects and advantages, the method of manufacturing a ceramic electronic part of the invention comprises the steps of:

firing 1)Pd electrodes or alloy electrodes containing Pd as a primary metal along with 2)ceramics in an atmosphere in which Pd cannot be oxidized at a temperature within the range (I) of the oxidizing temperature of Pd in air; and re-firing 1)the Pd electrodes or alloy electrodes along with 2)the ceramics in air at a temperature within the range (II) of the deoxidizing temperature of PdO in air.

The electrodes and the ceramics are sintered and integrated in one body so that a ceramic electronic part of the invention is manufactured.

It is preferable that the range (I) is from room temperature to a temperature below 1000° C.

It is also preferable that the range (II) is from 820° C. to a temperature below 1500° C., and that the firing step is shifted to the re-firing step at a temperature from 820° C. to 1000° C.

It is preferable that the atmosphere in which Pd cannot be oxidized within range (I) is at least one atmosphere selected from the group consisting of a gas atmosphere that is inactive to Pd, and a depressurized atmosphere.

It is preferable that the atmosphere in which Pd cannot be oxidized is an inactive gas atmosphere which is inactive to Pd and that the re-firing comprises the steps of:

reducing the pressure of the inactive gas in a furnace within the range (II) and introducing at least one gas selected from the group consisting of air, oxygen and gas containing mainly oxygen into the furnace;

repeating the step of reducing the pressure of the inactive gas in the furnace and introducing the at least one gas at least once; and re-firing the Pd electrodes or alloy electrodes along with the ceramics in air within the range (II).

It is preferable that the Pd electrodes or alloy electrodes are fired along with the ceramics in range (I) in at least one gas that is inactive to Pd and the gas is selected from the group consisting of a mixed gas of $N_2$ and $CO_2$, a mixed gas of He and $CO_2$, a mixed gas of Ar and $CO_2$, and $CO_2$ gas.

It is preferable that the Pd electrodes or alloy electrodes are fired along with the ceramics in at least one inactive gas selected from the group consisting of $N_2$, He and Ar at a temperature lower than 600° C. and within range (I), and are then fired along with the ceramics in at least one gas selected from the group consisting of mixed gas and $CO_2$ gas at 600° C. and above and within range (I). The mixed gas is prepared by introducing $CO_2$ gas into the at least one inactive gas. Carbon burns in $CO_2$ gas at 600° C. and above.

It is also preferable that 1% or more by volume of $CO_2$ gas is introduced into the at least one inactive gas.

It is preferable that the atmosphere in which Pd cannot be oxidized within range (I) is mixed with oxygen in accordance with the rise in temperature while the partial pressure of oxygen is controlled below the level of decomposing PdO. The atmosphere in which Pd cannot be oxidized includes the inactive gas atmosphere and the depressurized atmosphere.

It is preferable that the ceramic electronic part is a multilayer ceramic capacitor.

It is preferable that the gas which is inactive to Pd is at least one gas selected from the group consisting of $N_2$, He, Ar and $CO_2$.

It is preferable that the depressurized atmosphere is air depressurized to less than 100 torr.

It is preferable that the pressure of the gas inactive to Pd is reduced to less than 200 torr when the gas is replaced with air.

It is preferable that a programming rate is 50°–400° C. per an hour, where the programming rate is at which the temperature is raised.

It is preferable that the Pd electrodes or alloy electrodes integrated with the ceramics before the firing step is a green chip, and that the green chip includes organic constituents.

It is preferable that the green chips are stacked and sintered, and that the thickness of a stack of sintered chips is 5–30 mm.

BRIEF DESCRIPTION OF THE DRAWINGS

FIG. 2 (b) is a cross-sectional view taken on line b—b' of FIG. 1 after the green chip is cut on line a—a' of FIG. 1 and is fired completely in air.

FIG. 2 (c) is a cross-sectional view taken on line b—b' of FIG. 1 after the green chip is cut on line a—a' of FIG. 1 and is fired completely in air.

FIG. 3 (b) is a cross-sectional view of a chip having internal defects.

FIG. 4 (b) is a cross-sectional view taken on line b—b' of FIG. 1 after the green chip is cut on line a—a' of FIG. 1 and is fired in gas inactive to Pd at a temperature below 800° C.

DETAILED DESCRIPTION OF THE INVENTION

When a large volume of green chips is fired in an inactive gas such as $N_2$ or Ar, residual carbon left in the chips becomes so voluminous that the electric properties of the chips after the firing become poor. In order to reduce the residual carbon during the firing step, the steps of reducing the pressure of the inactive gas and then introducing air, oxygen or gas containing mainly oxygen are repeated at least once; then, the chips are fired in air. Alternatively, the green chips can be fired in the atmosphere in which Pd cannot be oxidized and carbon is burned, at the oxidizing temperature of Pd in air so that an residual carbon is not formed in the chips. More specifically, the green chips can be fired in a carbon dioxide atmosphere; inactive gas mixed with at least 1% by volume of carbon dioxide; or non-oxidizing gas atmosphere, to which oxygen is introduced in accordance with the rise in temperature while the partial pressure of oxygen is controlled below the level at which PdO is decomposed.

Figure 1:
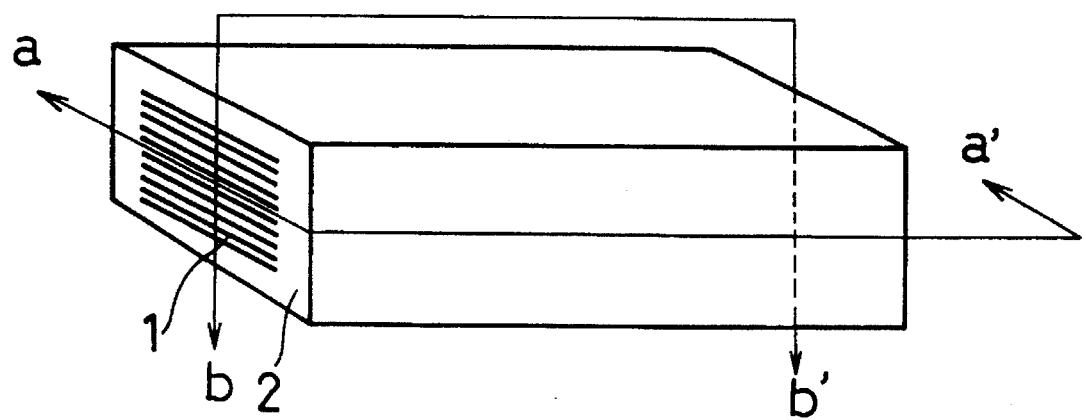
FIG. 1 is a perspective view of a green chip of one embodiment of the invention.
Figure 2A:
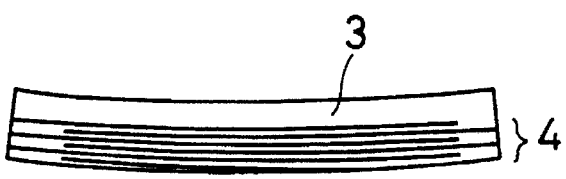
FIG. 2 (a) is a cross-sectional view taken on line b—b' of FIG. 1 after the green chip is cut on line a—a' of FIG. 1 and is fired in air at a temperature below 800° C.
Figure 2B:
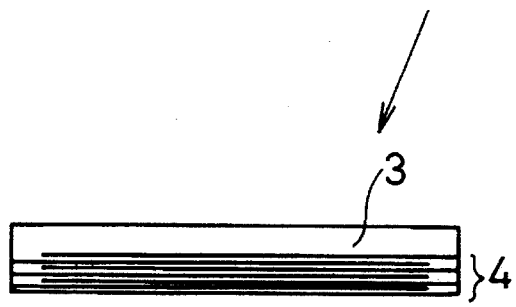
Figure 2C:
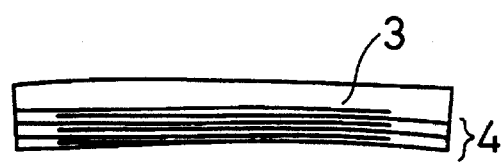
Figure 3A:
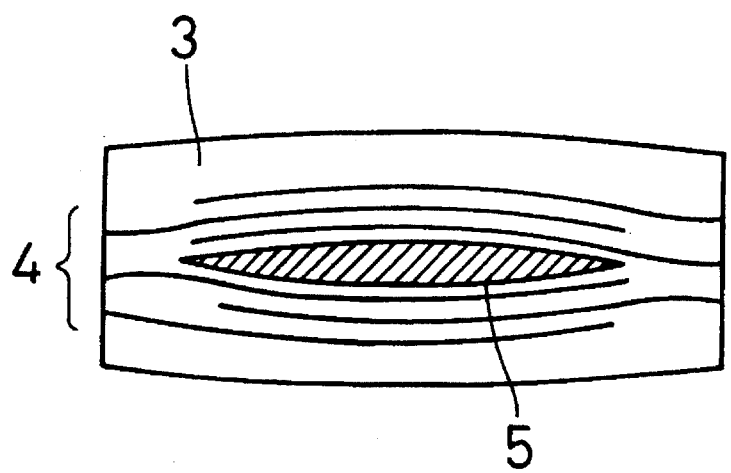
FIG. 3 (a) is a cross-sectional view of a chip having internal defects.
Figure 3B:
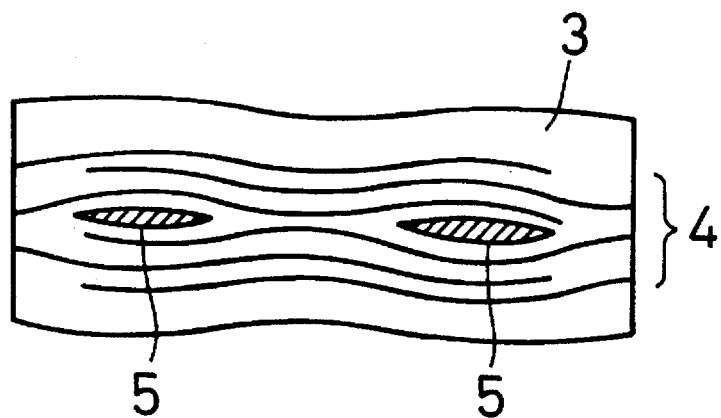

Internal stress generated by the expansion of electrodes due to oxidization during the firing step is one of the causes of internal defects forming in a ceramic electronic part which contains Pd inside the ceramic body. FIG. 1 shows a green chip having electrode films 1 and ceramic sheets 2. FIGS. 2 (a), 2 (b) and 2 (c) show the chip of FIG. 1 which is cut on line a—a' and is fired in air. As shown in FIG. 2(a), dielectric layer 4 expands more than protective layer 3 up to a temperature below 800° C. since the electrodes in dielectric layer 4 are oxidized at this temperature. As a result, the chip is warped. After being fired completely, the chip becomes either straight as shown in FIG. 2 (b) or warped with shrunken dielectric layer 4 as shown in FIG. 2 (c). According to the experiment directed by the inventors of this invention, a chip has internal defects 5 as shown in FIGS. 3 (a) and 3 (b) after being completely sintered when the level of warp of the chip after the firing step is large. This is because of the high probability of forming a free space in the chip that is warped to a considerable degree. Internal defects in the chip are caused by the free space. In order to prevent the oxidization of Pd particles, therefore, the particles can be fired in a gas atmosphere which is inactive to Pd (non-oxidizing gas) or in a depressurized atmosphere at the oxidizing temperature of Pd in air. As a result, the expansion of the dielectric layer and the formation of the free space are prevented, so that a sintered chip having no internal defects is manufactured, and the electrode films and the ceramic sheets are integrated and sintered into one body.

When a large volume of green chips containing electrode films and ceramic sheets is fired together in the inactive gas such as $N_2$ and Ar or in a depressurized atmosphere, residual carbon remains in the chips in a large quantity. Especially when the inactive gas is used, the inactive gas cannot be completely replaced with air at the deoxidizing temperature of PdO in air, so that the residual carbon cannot be sufficiently burned and the electric properties of the sintered chips become poor. By repeating the steps of lowering the pressure of the inactive gas and inserting air, oxygen or gas containing mainly oxygen at the replacement of the gas with air, oxygen is forcefully provided inside the chip, so that the residual carbon can be burned and the electric properties of the sintered chips are maintained.

In addition, if the green chips are fired in an atmosphere containing inactive gas and carbon dioxide or a carbon dioxide atmosphere at the oxidizing temperature of Pd in air (for example, below 1000° C.), the level of carbon is reduced without oxidizing Pd. This is because carbon is burned in carbon dioxide at 600° C. and above. The level of residual carbon is also reduced by adding oxygen, which has its partial pressure controlled below the level at which PdO is decomposed, in accordance with the rise in temperature of the inactive gas.

The invention will be explained in detail with reference to the attached figures and the following examples. The examples are illustrative and should not be construed as limiting the invention in any way.

EXAMPLE 1

A 30 μm thick and 1 m wide green sheet was formed by the following steps of:

preparing a dielectric coating material by adding butyral resin (organic binder), phthalate (plasticizer) and butyl acetate (solvent) into dielectric powder containing 95% by weight of barium titanate, 3% by weight of cerium oxide and 2% by weight of titanium oxide at the weight ratio of 0.1:0.05:0.7 relative to the weight of dielectric powder, and mixing and dispersing the dielectric coating material by a ball mill;

coating the dielectric coating material on a polyethylene terephthalate film; and drying the solvent contained in the dielectric coating material.

The green sheet was then cut into 30 cm×30 cm sections. Pd electrode paste was printed on the green sheet along an electrode pattern, thus forming 3 μm thick electrodes on the green sheet. The Pd electrode paste was prepared by mixing ethyl cellulose (organic binder) and α-terpineol (solvent) in about 0.4 μm average particle diameter Pd powder at the weight ratio of 0.1:0.7 relative to the weight of Pd powder.

FIG. 1 shows the green chip of this example. On an about 150 μm thick protective layer 3 including laminated green sheets with no electrode patterns, green sheets printed with electrode patterns were laminated so that a pair of electrodes which were connected to external electrodes were disposed to counter each other. As a result, dielectric layer 4 having 30 electrode films 1 was formed. An about 150 μm thick protective layer 3 including green sheets with no electrode patterns was again laminated on dielectric layer 4.

A green chip was then manufactured by pressing this layered body, including protective layer 3, dielectric layer 4 and protective layer 3, with 500 kgf/cm² and then cutting the pressed layered body into sections about 2 mm×4 mm.

After burning out all of the organic constituents in this green chip at 400° C. in air, the chip was fired to 1320° C. in the following two distinctive methods:

(1) a method of firing the chip up to 1320° C. in air; and (2) a method of firing the chip in $N_2$ atmosphere up to a temperature lower than 900° C., and in air from 900° C. to 1320° C.

As a test of the methods, the speed of raising the temperature was set at 200° C./hr in order to provide a condition in which internal defects are likely to be formed in the sintered chip.

In method (1), 5% of the sintered chips (24 out of 500 sintered chips) had internal defects as shown in FIGS. 3 (a) and 3 (b). However, in method (2), the method of the invention, no chip had internal defects.

The same results can be provided by using an inactive gas such as Ar instead of $N_2$, or a depressurized atmosphere instead of the inactive gas.

EXAMPLE 2

A 20 μm thick green sheet made of organic binder, dielectric powder mainly containing barium titanate, etc. was prepared by following the same steps as in Example 1.

A green chip was then manufactured by the following steps of:

printing electrode paste containing 0.4 μm average particle diameter Pd powder on the green sheet so as to form a 2.5 μm thick electrode pattern; and laminating green sheets with no electrode patterns, thus forming a protective layer;

laminating 40 green sheets printed with electrode patterns on the protective layer, thus forming a dielectric layer; and laminating green sheets with no electrode patterns on the dielectric layer, thus forming a protective layer.

The green chips were then stacked in a box-shaped ceramic case (sagger) to 30 mm thick. The sagger was made mainly of alumina, and its surface was coated with a stabilized zirconia. A melting adhesion inhibitor was adhered on the surface of the green chip by its static electricity. After burning out all the organic constituents of the green chips in $N_2$ gas, the chips in the sagger were then fired up to 1320° C. by the following methods:

(1) a method of firing in air up to 1320° C.;

(2) a method of firing in $N_2$ atmosphere to a temperature lower than 900° C., and then firing in air from 900° C. to 1320° C.; and (3) a method of firing in $N_2$ atmosphere contained in a furnace to a temperature lower than 900° C., depressurizing to 100 mmHg at 900° C., introducing air in the furnace, and then firing in air from 900° C. to 1320° C.

The speed of raising the temperature in methods (1), (2) and (3) was 200° C./hr.

As shown in the following Table 1, about 60% of 500 sintered chips had internal defects in method (1); none of 500 sintered chips had internal defects in methods (2) and (3).

Terminal electrodes were added to the other 500 sintered chips so as to test the insulating resistances of the sintered chips manufactured by methods (1), (2) and (3). As shown in the following Table 1, insulating resistance was lower in method (2) than in method (3). Insulating resistance obtained in method (3) was at a preferable level.

TABLE 1

| Methods | Percentage of creating internal defects (%) | Percentage of obtaining less than $10^{10}$ Ω insulating resistance (%) |
| --- | --- | --- |
| (1) | 62.2 | 0 |
| (2) | 0 | 2.2 |
| (3) | 0 | 0 |

Thus, by following the steps of depressurizing the inactive gas and replacing the gas with air, the method of the invention becomes more effective. The same results can be provided in method (3) even if oxygen or gas containing mainly oxygen instead of air is introduced into the furnace after depressurizing the inactive gas.

EXAMPLE 3

After burning out all the organic constituents of the same type of green chip as Example 1, the chip was fired up to 1320° C. in the following two distinctive methods;

(1) a method of firing the chip in air up to 1320° C.; and (2) a method of firing the chip in $N_2$ atmosphere up to a temperature lower than 600° C. then firing the chip in $N_2$, $N_2+1\%$ by volume of $CO_2$, $N_2+5\%$ by volume of $CO_2$ or $CO_2$ from 600° C. to a temperature lower than 900° C., and firing the chip in air from 900° C. to 1320° C.

The speed of raising the temperature was 200° C./hr.

In method (1), 5% of sintered chips (24 out of 500 sintered chips) had internal defects as shown in FIGS. 3 (a) and 3 (b). In method (2), however, no sintered chip had internal defects.

As shown in the following Table 2, a sintered chip with a high insulating resistance was provided when the chip was fired in the atmosphere containing 1% or more by volume of $CO_2$ in method (2).

TABLE 2

| Atmosphere in which a green chip was fired from 600° C. to a temperature lower than 900° C. | Insulating resistance (Ω) |
| --- | --- |
| $N_2$ | $9 \times 10^9$ |
| $N_2 + 1\%$ by volume of $CO_2$ | $2 \times 10^{10}$ |
| $N_2 + 5\%$ by volume of $CO_2$ | $>5 \times 10^{10}$ |
| $CO_2$ | $>5 \times 10^{10}$ |

The same results can be provided even if the chip was fired in the atmosphere containing $CO_2$ from room temperature up to a temperature below 900° C.

EXAMPLE 4

After burning out all the organic constituents of the same type of green chip as Example 1 in $N_2$ atmosphere, the chip was fired to a temperature lower than 850° C. in the atmosphere, in which oxygen was introduced to the $N_2$ atmosphere while the partial oxygen pressure was controlled below a level of decomposing PdO. From 850° C., the chip was fired in air. The sintered chip had no internal defects and a preferable level of insulating resistance.

The same results can be provided by using an inactive gas such as Ar instead of $N_2$.

EXAMPLE 5

Figure 4A:
FIG. 4 (a) is a cross-sectional view taken on line b—b' of FIG. 1 after the green chip is cut on line a—a' of FIG. 1 and is fired in air at a temperature below 800° C.
Figure 4B:
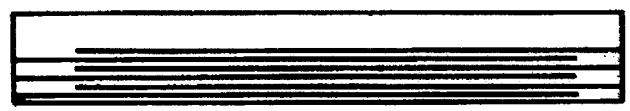

The green chip of the type in Example 1 was cut in half along line a—a' of FIG. 1. FIG. 4 (a) shows the chip which was fired up to a temperature lower than 800° C. in air. The chip shown in FIG. 4 (a) was warped since the dielectric layer expanded in a longitudinal (horizontal) direction. However, when the chip was fired in $N_2$ or $N_2+5\%$ by volume of $CO_2$ up to a temperature lower than 800° C., Pd was not oxidized so that the chip remained straight as shown in FIG. 4 (b).

In other words, when Pd electrodes are fired in air, stress is generated by the oxidization of Pd during the firing step. If the ceramic powder cannot mobilize freely, a free space, which forms an internal defect after the firing, is likely to be generated. When the chip is fired in $N_2$ or $N_2+CO_2$ up to a temperature lower than 900° C., stress due to the expansion of oxidized Pd is not formed in the chip.

In Examples 1–5, alloy electrodes containing Pd as a primary metal can be used instead of Pd electrodes. Also, the same results are provided by using inactive gas such as Ar instead of $N_2$.

Even though a multilayer ceramic capacitor was manufactured in Examples 1–5, the method of the invention can be applied to manufacture other electronic parts which have electrodes containing Pd in the ceramic body and the same effects are provided on these electronic parts.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intendend to be embraced therein.

We claim:

1. A method of manufacturing a ceramic electronic part comprising the steps of:

firing $^{a)}$Pd electrodes or alloy electrodes containing Pd as a primary metal along with $^{b)}$ceramics in an atmosphere in which Pd cannot be oxidized at a temperature of from room temperature to below 1000° C. (range (I)) and in an atmosphere which is inactive to Pd; and re-firing $^{a)}$said Pd electrodes or alloy electrodes along with $^{b)}$said ceramics in air at a temperature of from 820° C. to below 1500° C., so that said Pd electrodes or alloy electrodes are sintered as metal and integrated with said ceramics in one body and wherein the firing is shifted to the refiring at a temperature of from 820° C. to 1000° C.

2. The method according to claim 1, wherein the atmosphere in which Pd cannot be oxidized within the range (I) is at least one atmosphere selected from the group consisting of a gas atmosphere which is inactive to Pd and a depressurized atmosphere.

3. The method according to claim 1 or 2, wherein the atmosphere in which Pd cannot be oxidized is at least one inactive gas selected from the group consisting of an $N_2$ gas, an He gas, an Ar gas, a $CO_2$ gas, a mixed gas of $N_2$ and $CO_2$, a mixed gas of He and $CO_2$, and a mixed gas of Ar and $CO_2$.

4. The method according to claim 3, wherein 1% or more by volume of $CO_2$ gas based on the total amount of gas is introduced to the at least one inactive gas.

5. The method according to claims 1 or 2, wherein the atmosphere in which Pd cannot be oxidized within the range (I) is mixed with oxygen with a rise in temperature while the partial pressure of oxygen is controlled below a level of decomposing PdO.

6. The method according to claim 1 or 2, wherein the gas atmosphere inactive to Pd and is at least one gas selected from the group consisting of $N_2$, He, Ar and $CO_2$.

7. The method according to claim 1 or 2, wherein the atmosphere is a depressurized atmosphere that is depressurized to less than 100 torr.

8. The method according to claim 1 or 2, wherein the pressure of the inactive gas is reduced to less than 200 torr.

9. A method of manufacturing a ceramic electronic part comprising the steps of:

firing Pd electrodes or alloy electrodes containing Pd as a primary metal along with ceramics in an atmosphere in which Pd cannot be oxidized at a temperature of from room temperature to below 1000° C. (range (I)) and comprising a second firing in at least one atmosphere selected from the group consisting of a $CO_2$ gas, an inactive gas and $CO_2$ gas at 600° C. and above and within the range (I): and re-firing $^{a)}$said Pd electrodes or alloy electrodes along with said ceramics in air at a temperature or from 820° C. to below 1500° C. (range(II)), so that said Pd electrodes or alloy electrodes are sintered as metal and integrated with said ceramics in one body and wherein the firing is shifted to the refiring at a temperature of from 820° C. to below 1000° C., wherein the firing of the Pd electrodes or alloy electrodes with the ceramics is carried out in at least one inactive gas selected from the group consisting of $N_2$, He and Ar at a temperature lower than 600° C. and within the range (I), and further comprising a second firing in at least one gas atmosphere selected from the group consisting of mixed gas and $CO_2$ gas at 600° C. and above and within the range (I), said mixed gas being prepared by introducing $CO_2$ gas into said at least one inactive gas.

10. The method according to claim 9, wherein 1% or more by volume of $CO_2$ gas based on the total amount of gas is introduced to the at least one inactive gas.

11. The method according to claim 9, wherein the ceramic electronic part is a multilayer ceramic capacitor.

12. The method according to claim 1 or 9, wherein the Pd electrodes or alloy electrodes are fired along with the ceramics by raising temperature at a rate of 50°–400° C. per an hour.

13. The method according to claim 1 or 9, wherein the Pd electrodes or alloy electrodes integrated with the ceramics before the firing is a green chip, and wherein the green chip includes resin binder.

14. The method according to claim 13, wherein the green chips are stacked and sintered together; and wherein the stack of sintered chips has a thickness of 5–30 mm.

15. The method according to claim 1 or 9, comprising the steps of:

reducing pressure of a gas atmosphere in a furnace and introducing at least one gas selected from the group consisting of air, oxygen, and gas containing mainly oxygen into said furnace at least once when said firing is shifted to said refiring: and re-firing said Pd electrodes or alloy electrodes along with said ceramics in air in the range (II).

* * * * *